(12) United States Patent
Fox et al.

(10) Patent No.: US 10,662,603 B2
(45) Date of Patent: May 26, 2020

(54) SLOPE ROLLER ASSEMBLY

(71) Applicant: Independence Excavating, Inc., Independence, OH (US)

(72) Inventors: Justin Fox, Cheswick, PA (US); Jeff Vivian, Sarver, PA (US)

(73) Assignee: INDEPENDENCE EXCAVATING, INC., Independence, OH (US)

( * ) Notice: Subject to any disclaimer, the term of this patent is extended or adjusted under 35 U.S.C. 154(b) by 0 days.

(21) Appl. No.: 16/104,969

(22) Filed: Aug. 20, 2018

(65) Prior Publication Data

US 2019/0055708 A1 Feb. 21, 2019

Related U.S. Application Data

(60) Provisional application No. 62/547,207, filed on Aug. 18, 2017.

(51) Int. Cl.
    *E02D 17/00* (2006.01)
    *E02D 17/20* (2006.01)
    *E02D 3/00* (2006.01)
    *B60R 1/00* (2006.01)

(52) U.S. Cl.
    CPC ............. *E02D 3/00* (2013.01); *B60R 1/00* (2013.01); *E02D 17/20* (2013.01); *B60R 2300/80* (2013.01)

(58) Field of Classification Search
    CPC .. E02D 3/00; E02D 17/20; B60R 1/00; B60R 2300/80
    See application file for complete search history.

(56) References Cited

U.S. PATENT DOCUMENTS

| | | | | |
|---|---|---|---|---|
| 365,773 A * | 7/1887 | Bailey | .................... | E01C 19/26 404/122 |
| 546,194 A * | 9/1895 | Shaw | ..................... | E01C 19/27 404/132 |
| 557,006 A * | 3/1896 | Miller | ................... | A01B 39/04 172/431 |
| 635,279 A * | 10/1899 | Corbin | ................... | E01C 19/27 404/132 |
| 1,052,643 A * | 2/1913 | Baechle | ................. | E01C 19/27 404/132 |
| 1,559,406 A * | 10/1925 | Carson | .................. | E01C 19/25 404/127 |
| 3,302,540 A * | 2/1967 | Fuentes, Jr. | ............ | E02D 3/039 404/127 |
| 3,318,211 A * | 5/1967 | Grace | ................... | E02D 3/026 404/124 |
| 3,478,656 A * | 11/1969 | McDonald | ............. | E02D 3/026 111/118 |
| 3,964,797 A * | 6/1976 | Swanson | ................ | B60C 27/20 305/114 |
| 4,260,281 A * | 4/1981 | Sargent | .................. | E02D 3/039 404/117 |

(Continued)

*Primary Examiner* — Benjamin F Fiorello
(74) *Attorney, Agent, or Firm* — McDonald Hopkins LLC

(57) ABSTRACT

A slope roller assembly attaches to a vehicle. The slope roller assembly includes an armature and a roller member. The armature is secured to the vehicle. The roller member is secured to the armature. The roller member includes one or more grousers extending radially from a cylindrical body. The roller member may include or be mounted on a rotatable shaft. Rotation of the shaft when the slope roller assembly is installed and positioned may result in a footprint that is uninterrupted.

18 Claims, 8 Drawing Sheets

(56) References Cited

U.S. PATENT DOCUMENTS

| | | | | |
|---|---|---|---|---|
| 4,610,567 | A * | 9/1986 | Hosking | E01C 19/268 172/547 |
| 4,750,792 | A * | 6/1988 | Caron | E02D 3/026 305/114 |
| 4,865,400 | A * | 9/1989 | Caron | E02D 3/026 305/114 |
| 4,932,477 | A * | 6/1990 | Atwood | A01B 29/043 172/519 |
| 4,964,753 | A * | 10/1990 | Ciminelli | E02D 3/026 404/117 |
| 5,104,257 | A * | 4/1992 | Lebrero Martinez | B62D 33/0604 180/20 |
| 5,114,269 | A * | 5/1992 | Shepherd | E01C 19/236 404/122 |
| 5,359,835 | A * | 11/1994 | Majkrzak | A01B 29/045 404/122 |
| 5,511,901 | A * | 4/1996 | Yates | E01C 19/236 404/124 |
| 5,860,764 | A * | 1/1999 | Roberts | E01C 19/236 404/124 |
| 6,843,615 | B1 * | 1/2005 | Cook | E02D 3/026 404/122 |
| 2006/0239776 | A1 * | 10/2006 | Thompson | E02D 3/039 404/124 |
| 2007/0086861 | A1 * | 4/2007 | Pratt | E01C 19/268 404/124 |
| 2008/0267719 | A1 * | 10/2008 | Corcoran | E01C 19/266 405/271 |
| 2010/0135724 | A1 * | 6/2010 | Roth | E01C 19/235 404/124 |
| 2013/0313891 | A1 * | 11/2013 | O'Neill | B62D 55/202 305/198 |
| 2014/0301785 | A1 * | 10/2014 | Meier | E01C 19/23 404/122 |
| 2016/0217331 | A1 * | 7/2016 | Kowatari | E02F 9/261 |

* cited by examiner

SLOPE ROLLER ASSEMBLY

CROSS-REFERENCE TO RELATED APPLICATION(S)

This application claims the benefit of U.S. Provisional Patent Application No. 62/547,207, entitled "SLOPE ROLLER ASSEMBLY," filed on Aug. 18, 2017, which is hereby incorporated by reference.

FIELD OF INVENTION

The present disclosure is generally related to a slope roller assembly and, more particularly, to a slope roller assembly for construction equipment.

BACKGROUND

During construction, excavation, or at other times, vegetation and soil may be disturbed. Often, construction results in exposed soil on hills or slopes. For example, construction on the side of highways may result in slopes having no vegetation and exposed soil. If left untreated, the exposed slope may result in significant erosion, discharge, and pollution to storm drains or watercourses.

Some traditional treatments include deploying terraces and slope roughening. To roughen a slope, the exposed soil is worked to create horizontal grooves, imprints or depressions that are parallel to the slope contour. This roughening must be done for the entire surface of the slope so that runoff and erosion are reduced. The depressions may trap sediment and allow vegetation to reclaim the soil. Creating the grooves in the soil can be time consuming, expensive, and demanding on equipment.

Some ways to rough soil include use of special attachments to a front end loader, use of special blades, or navigating a continuous or endless track vehicle on the slope. For example, a bulldozer is driven up and down a slope. The track of the bulldozer creates depressions in the soil. This is often a tedious process as the bulldozer typically has two tracks and must create impressions over the entire surface of the slope. Further, the repeated navigation up and down a slope adds to the work hours for the bulldozer and can reduce the expected life of the bulldozer.

Thus, there remains a need for an apparatus to roughen a slope with more efficiency, reduced cost, reduced time, reduced man hours, and increased effectiveness. Moreover there is a need for an improved method of roughening a slope.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Disclosed herein is a slope roller assembly for roughening earth, the slope roller assembly comprising a roller member comprising, a cylindrical body extending from a distal end to a proximal end, a plurality of grousers extending radially from the cylindrical body, and a rotatable shaft passing through the cylindrical body, wherein the roller member is operatively attachable to a vehicle, and wherein the grousers are constructed and arranged to produce grooves in earth that generally replicate tracks of a continuous track driven vehicle. The slope roller assembly may further comprise an armature attached to the rotatable shaft and operatively attachable to a vehicle. The armature may comprise one or more attachment arms for attaching to the vehicle. The plurality of grousers may comprise one or more rows of grousers. The one or more rows of grousers may comprise a first row and a second row, wherein the first row is not aligned with the second row. The one or more rows of grousers may comprise a third row generally aligned with the first row. The one or more grousers may be disposed about a surface of the cylindrical body such that a footprint of the cylindrical body is free of vertical seams. In another example, the slope roller assembly may comprise one or more bearings disposed within the cylindrical body, and wherein the rotatable shaft is disposed within the one or more bearings. In another aspect, the slope roller assembly may comprise an enforced central support disposed in a general center of the cylindrical body.

Also disclosed herein is a slope roller assembly for a construction vehicle comprising an armature operatively attachable to the construction vehicle and a roller member selectively attached to the armature, wherein the roller member comprises a cylindrical body comprising one or more rows of grousers extending therefrom, and a rotatable shaft, wherein the roller member is operatively attached to the armature, and wherein the roller member operatively rotates about the rotatable shaft to generate horizontal impressions within a surface. The armature may comprise one or more apertures that operatively receive one or more pins to secure the armature to the construction vehicle. The armature may be selectively attachable to a ripper mount of the construction vehicle. The slope roller may comprise one or more springs operatively biasing the roller member away from the armature. The roller member may be adjustably pressured towards the surface.

A slope roller system for roughening earth is disposed. The slope roller system may comprise a slope roller assembly comprising an armature and a roller member, wherein the roller member is operatively secured to the armature and comprising a plurality of grouser bar protrusions extending radially therefrom, and wherein the armature selectively attaches the slope roller assembly to a vehicle, a camera comprising a field of view selectively comprising at least a portion of the roller member, and a monitor communicatively coupled to the camera and operatively displaying media associated with the roller member. The monitor may be mounted within a cab of the vehicle. Pressure exerted by the slope roller assembly may be adjustable. The plurality of grouser bars may be parallel with each other. The slope roller may comprise a footprint of between generally 55 inches and 75 inches. The footprint may be free of horizontal gaps.

The following description and the drawings disclose various illustrative aspects. Some improvements and novel aspects may be expressly identified, while others may be apparent from the description and drawings.

DESCRIPTION OF THE DRAWINGS

The present teachings may be better understood by reference to the following detailed description taken in connection with the following illustrations, wherein.

Figure 1:
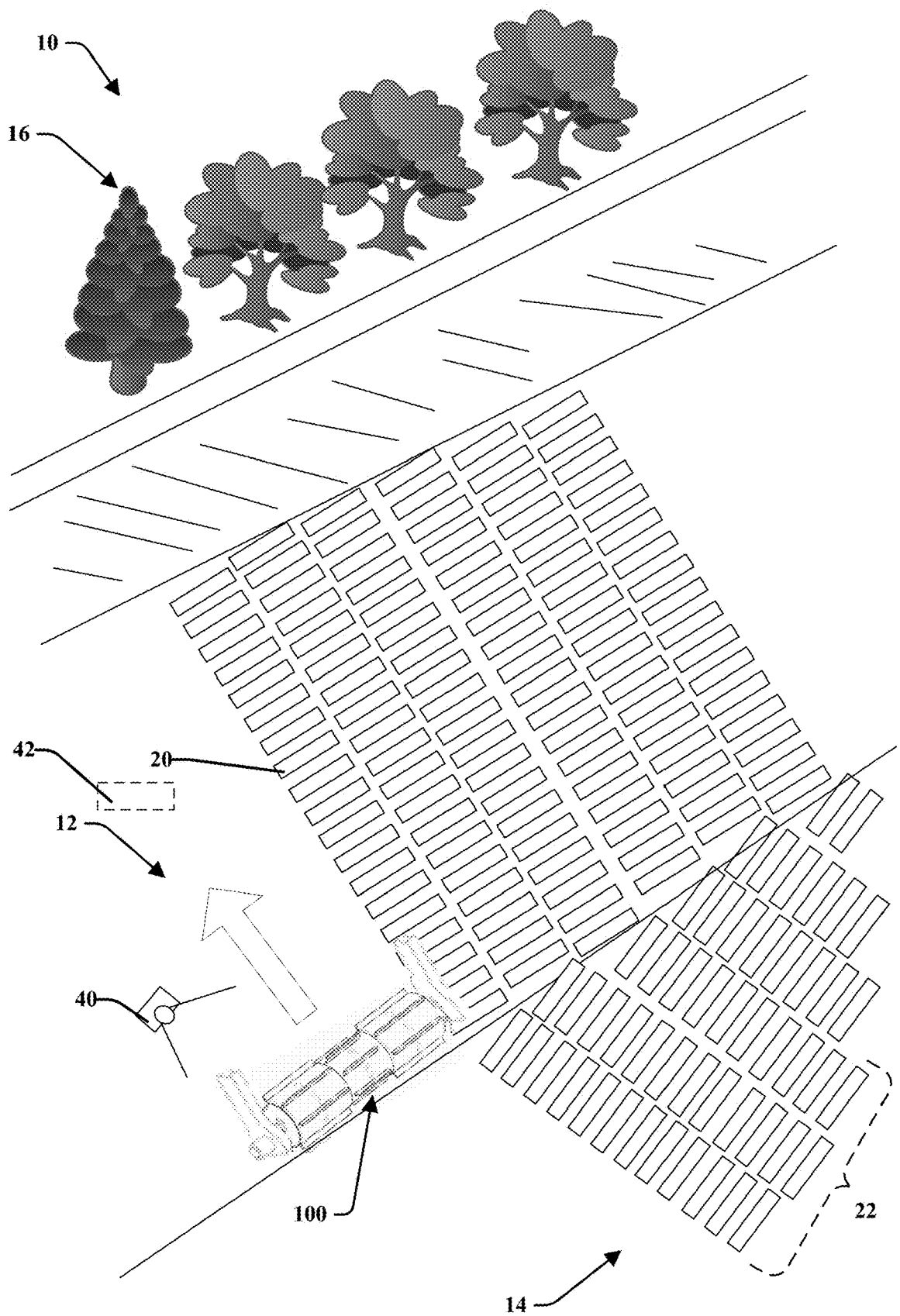
FIG. 1 is an environmental view of a slope roller assembly operatively generating grooves in soil in accordance with various disclosed aspects.
Figure 2:
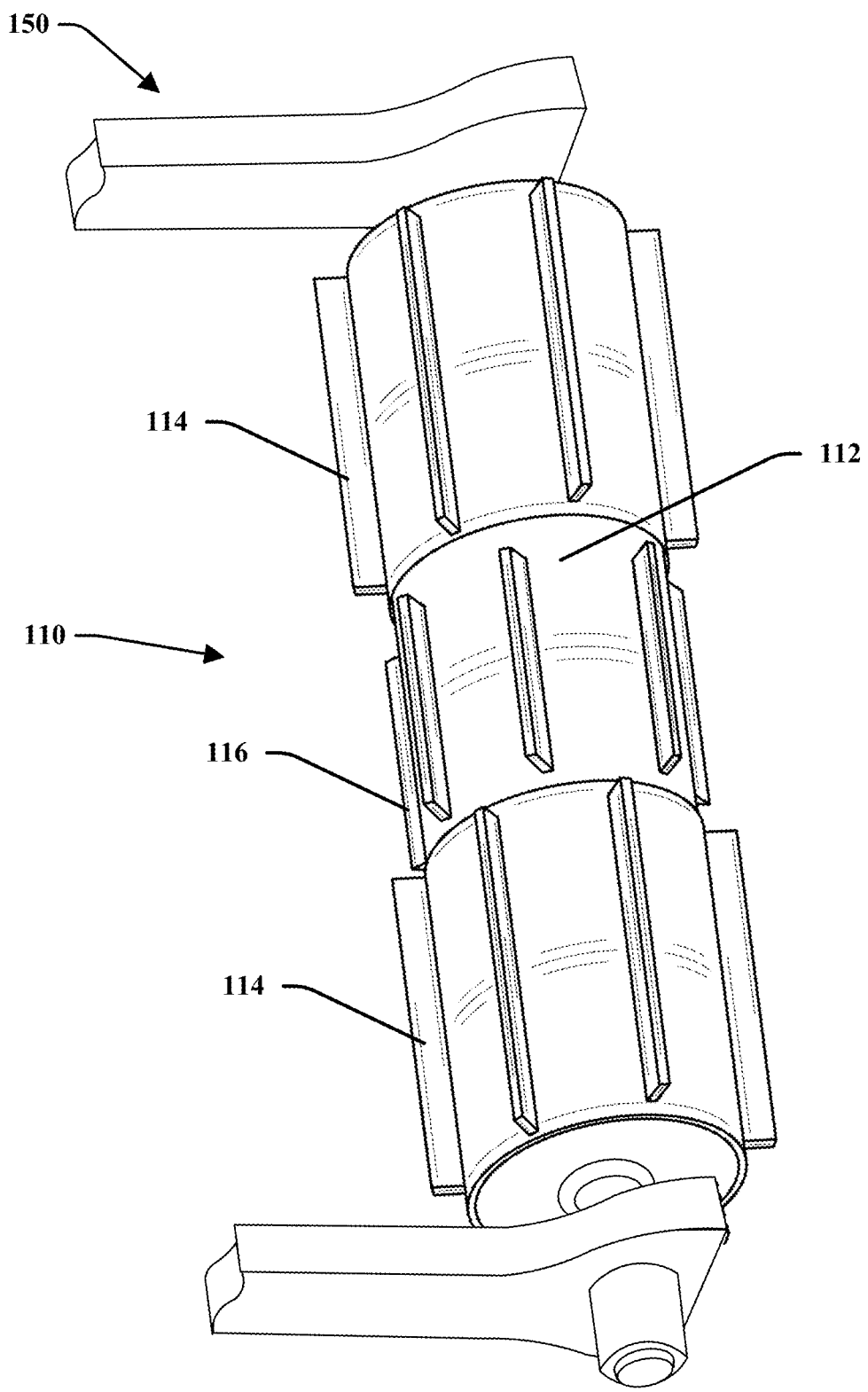
FIG. 2 is a perspective view of the slope roller of FIG. 1 in accordance with various disclosed aspects.
Figure 3:
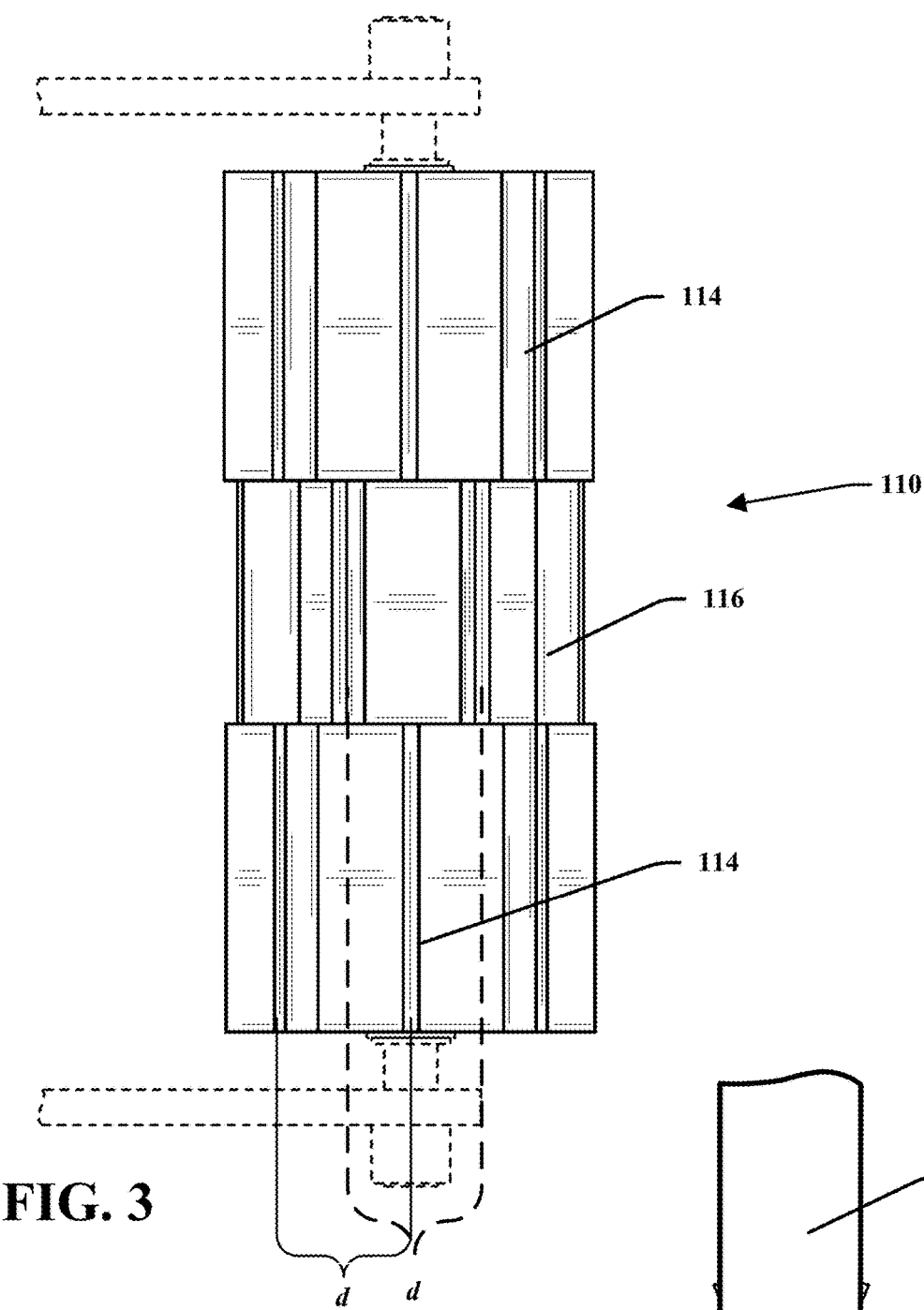
FIG. 3 is a top view of the slope roller of FIG. 1 in accordance with various disclosed aspects.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" or terms of similar import do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Typically tracking a slope in a construction site involves tracking by construction equipment with an endless track vehicle (e.g., excavator, bulldozer, etc.). An operator must drive the vehicle one track width at a time to cover the entire surface of the slope. For instance, endless track vehicles generally comprise a right tack and a left track. This means that there is a gap between the right and left track what will need to be covered so that the vehicle moves only the width of a single track per pass. Process is very slow, dramatically increases wear to the machine, increases fuel costs, increases man hours, and may slow progression of a construction project. In some examples, embodiments may result in increased efficiency of 25%-30% in roughening of slopes, and a decrease of 25%-30% in track wear to a machine to which a slope roller apparatus is attached.

Described herein are slope roller apparatuses and methods that may increase productivity while tracking in slopes on construction sites, decrease undercarriage wear, increase germination rates for establishing re-growth after ground disturbance, decrease runoff, decrease erosion, or the like. Embodiments disclosed herein generally relate to a slope roller apparatus for construction machinery or equipment and methods of slop rolling. The slope roller apparatus may include an attachment armature and a roller member. The attachment armature may operatively couple the roller member to construction equipment. It is noted that the slope roller apparatus may be attached to equipment via an armature comprising one or more shanks (e.g., single shank attachment, dual shank attachment, etc.). The roller member generally comprises a plurality of grouser bars that, when attached to the vehicle and directed over soil, may roughen the soil to create appropriate grooves or indentations therein. It is noted that the slope roller assembly may comprise metal, such as steel.

While embodiments may reference a particular type of construction equipment for simplicity of explanation, such as a bulldozer, other equipment may be utilized. It is noted that a bulldozer may be particularly well suited for traversing steep grades that may require tracking. Moreover, the slope roller apparatuses may be used to roughen surfaces of any grade, but may be particularly suited for roughing surfaces of slopes.

In at least one embodiment, the slope roller assembly may be selectively attached to or installed on a bulldozer with a ripper or scarfire assembly on the back of the bulldozer. The armature of the slope roller assembly may comprise an attachment mechanism to allow for removal and installation for selective attachment. In at least one example, the attachment mechanism may comprise one or more quick locking pins, other fasteners, hooks, clasps, or the like. For instance, once the ripper shanks are removed, the slope roller assembly will easily fit into a shank pocket of the ripper attachment and the one or more pins may hold the slope roller assembly in place. Once installed the slope roller assembly may increase the foot print of the bulldozer while tracking in slopes, ponds, or areas where erosions are a concern. In some embodiments, the bulldozer's footprint may be doubled. An operator may lower or raise the slope roller assembly via a hydraulic arm or by other mechanisms. It is noted that the operator may lower the slope roller assembly until a desired pressure is made to effectively track the ground and mitigate erosion. It is noted that the pressure may be monitored via gages, sensors, visual inspection, or the like. The track marks create a small trench for seed to adhere to. This reduces erosion and increases germination rate.

Turning now to FIG. 1, there is an environmental view 10 of a slope roller assembly 100 in operation. It is noted that a machine that may operatively maneuver (e.g., pull or push) the slope roller assembly 100, but the machine is not shown for readability and simplicity of explanation. The slope roller assembly 100 may traverse a slope 12 to generate grooves 20, or other formations in the ground. As shown, the footprint 22 of the slope roller assembly 100 may allow for formation of grooves 20 without any gaps or need to progress a single track width at a time. During operation, the operator maneuvers the slope roller assembly 100 between a general bottom or horizontal 14 and up/down the slope 12 in the direction of undisturbed vegetation 16. It is noted that the grooves 20 may be generally horizontally formed and generally parallel to the slope 12 contour.

In at least one embodiment, a camera 40 and monitor 42 may be utilized. The camera 40 may be positioned on a machine with a field of view encompassing all or part of the slope roller assembly 100. The monitor 42 may be positioned in a cab of the machine or at a remote location for monitoring the slope roller assembly. In an example, the camera and monitor may be communicatively coupled via a wired or wireless connection. For instance, embodiments may utilize various radio access network (RAN), e.g., Wi-Fi, global system for mobile communications, universal mobile telecommunications systems, worldwide interoperability for microwave access, enhanced general packet radio service, third generation partnership project long term evolution (3G LTE), fourth generation long term evolution (4G LTE), third generation partnership project 2, BLUETOOTH®, ultra mobile broadband, high speed packet access, $x^{th}$ generation long term evolution, or another IEEE 802.XX technology. Furthermore, embodiments may utilize wired communications.

The camera 40 may provide a feed of the machine to the monitor 42 so that the operator may view the slope roller assembly being used, installed, removed, adjusted for pressure, or the like. This may allow the operator to face forward in the machine, increasing operator's awareness, making this a nice safety feature, allowing the operator to notice any obstructions, people, or dangers during this operation.

Referring to FIGS. 2-7, there depicted are various views of slope roller assembly 100 in accordance with aspects disclosed herein. The slope roller assembly 100 may generally comprise a roller member 110 and an armature 150. The roller member 110 may contact soil to form grooves 20 and the armature 150 may allow for coupling of the roller member 110 to a vehicle.

In an aspect, roller member 110 may comprise a generally cylindrical body 112. The body may comprise a monolithic construction or may be comprised of one or more sections operatively attached together, as described herein. According to at least one embodiment, the cylindrical body 112 may comprise one or more protrusions or grouser bars 114 and 116.

The grouser bars 114 and 116 may comprise metal bars that extend outwards from the cylindrical body 112 and may generate the grooves 20 to form footprint 22. In an aspect, the grouser bars 114 and 116 may replicate grouser bar marks or imprints that would be generated by construction equipment with continuous tracks.

In another aspect, the cylindrical body 112 may comprise one or more rows of grouser bars 114 and 116, wherein the grouser bars 114 and 116 are spaced apart or offset from each other. Accordingly, as the roller member 110 rolls along soil or another surface, the grouser bars 114 and 116 may form tracks in the soil. Spacing the grouser bars 114 and 116 apart may generally replicate tracks of a bulldozer or other equipment. The grouser bars 114, for instance, are non-linear with the grouser bars 116 as they extend radially from the cylindrical body 112. In other embodiments, however, the grouser bars 114 and grouser bars 116 may be linear or in line with each other.

The grouser bars 114 and 116 may be generally equally spaced a distance d (where d is a number) from adjacent grouser bars so that resulting grooves 20 are generally uniform to provide an orderly footprint 22. It is noted, however, that the grouser bars 114 and 116 may be spaced at different distances or configurations. Moreover, the grouser bars 114 and 116 may be sized and shaped according to a desired footprint 22. For instance, the grouser bars 114 and 116 may comprise zig-zag protrusions, sinusoidal protrusions, waffle-shaped protrusions, studded protrusions, or the like. The shape and orientation of the grouser bars 114 and 116 is not limited to those used to replicate tracks of a vehicle.

Figure 4:
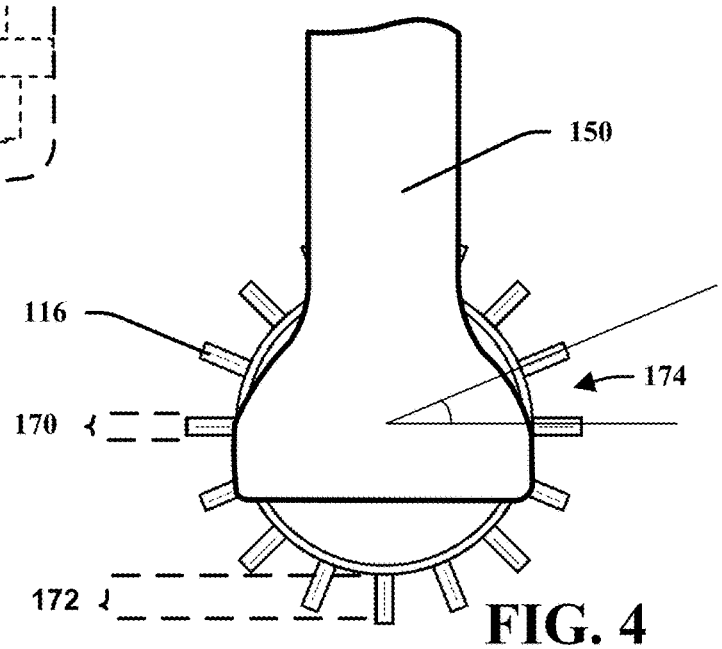
FIG. 4 is a side view of the slope roller of FIG. 1 in accordance with various disclosed aspects.

As shown in FIG. 4, the grousers 116 may comprise a thickness 170 and a length 172. Moreover, the grousers 116 may be generally equally spaced radially about the cylindrical body 112. In at least one example, the thickness 170 may be generally 0.5 inches to 3 inches, such as 1 inch. In another example, the length 172 may be generally 1 inch to 5 inches, such as generally 3 inches. Moreover, the grousers 116 may be spaced apart so that an angle 174 between the grousers 116 is generally 15 to 45 inches, such as about 22.5 inches. It is noted that exemplary measurements are for purpose of illustration. As such, embodiment may deviate from these measurements.

Figure 5:
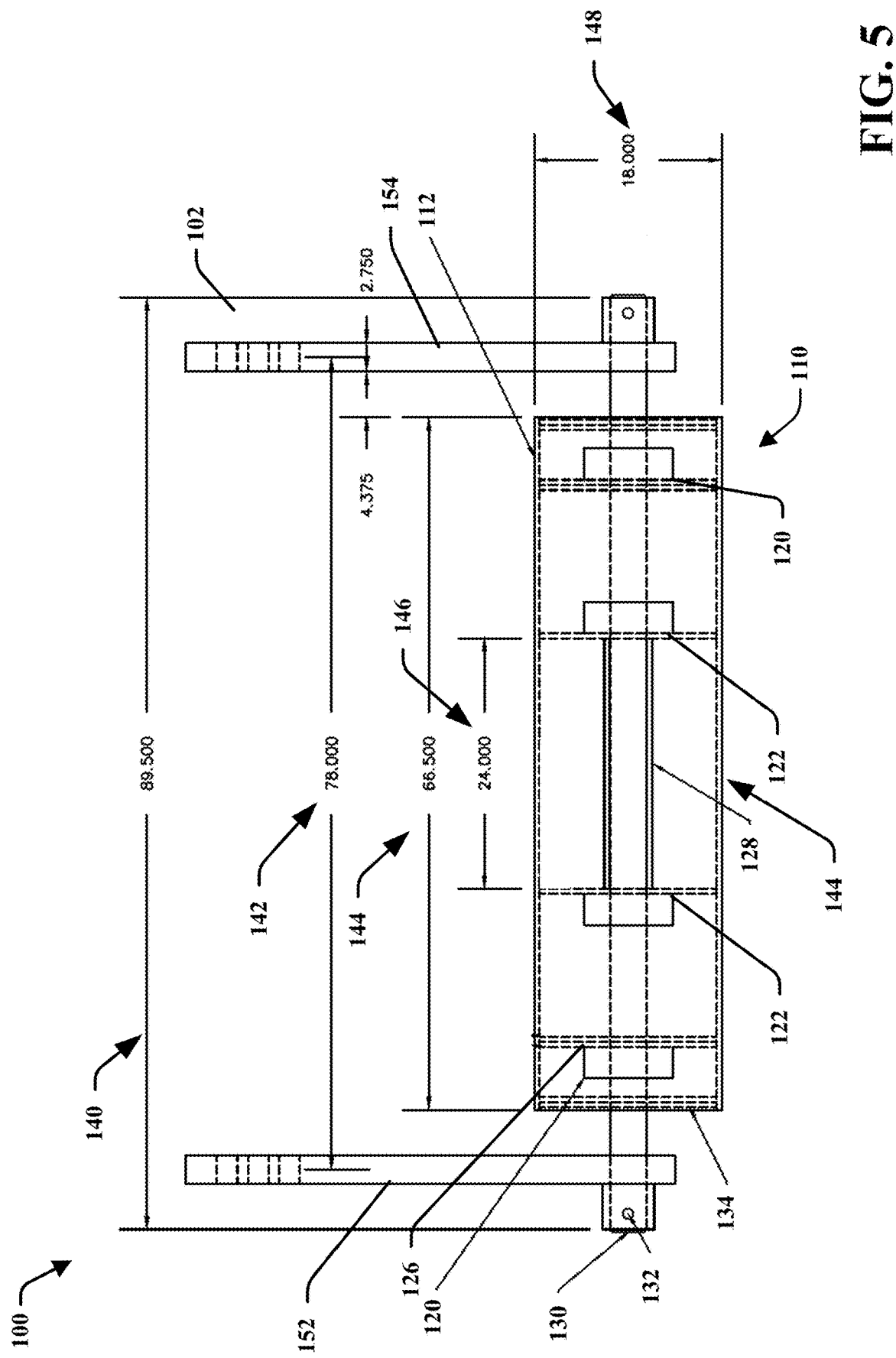
FIG. 5 is a cross-sectional view of the slope roller of FIG. 1 in accordance with various disclosed aspects.
Figure 6:
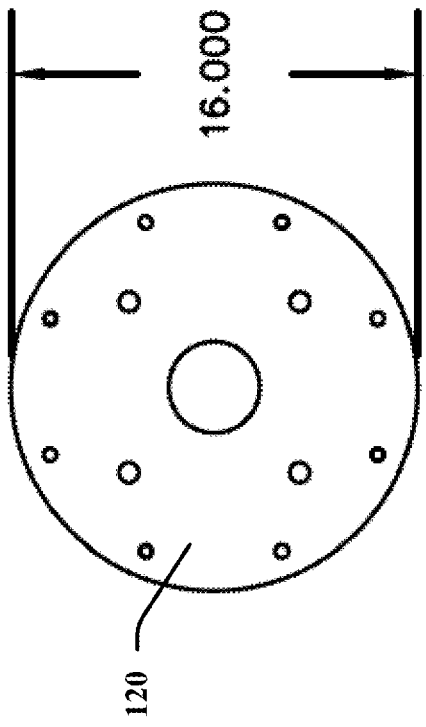
FIG. 6 is a side view of an inner bearing mount for the slope roller of FIG. 1 in accordance with various disclosed aspects.
Figure 7:
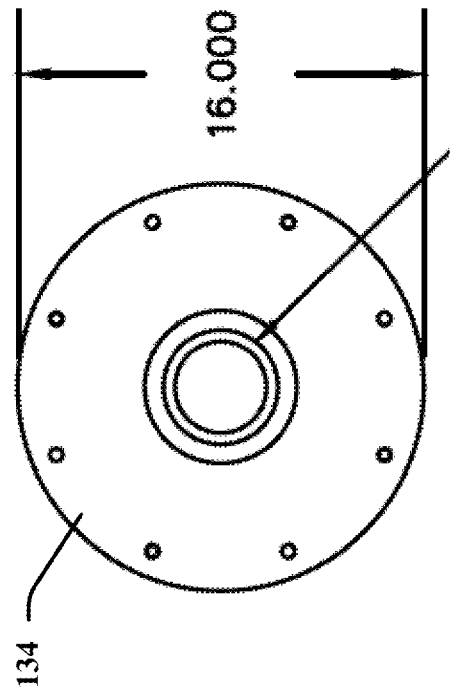
FIG. 7 is a side view of an outer bearing mount for the slope roller of FIG. 1 in accordance with various disclosed aspects.
Figure 8:
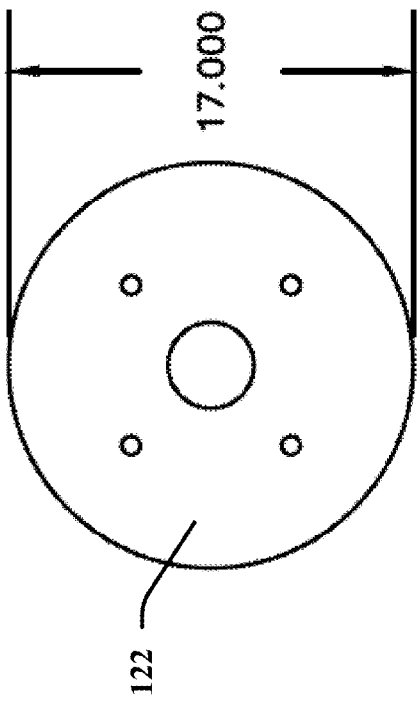
FIG. 8 is a side view of a bearing mount ring for the slope roller of FIG. 1 in accordance with various disclosed aspects.
Figure 9:
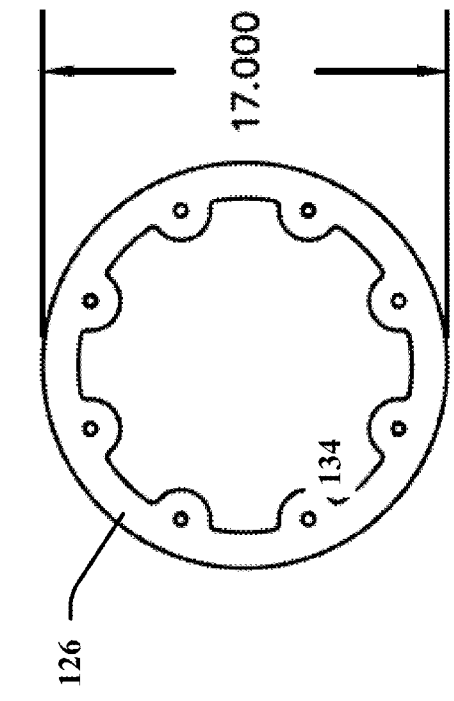
FIG. 9 is a side view of a cap for the slope roller of FIG. 1 in accordance with various disclosed aspects.

FIG. 5 illustrates a cross-sectional view of the slope roller assembly 100 in accordance with disclosed aspects. The roller member 110 may include one or more bearings 120, 122. The bearings may include inner bearings 122 and outer bearings 120. The outer bearing 120 may be positioned proximal a mount plate ring 126. A rotatable shaft 130 may pass through the bearing bearings 120, 122, and the mount plate ring 126. The bearings 120, 122 may be mounted in a support of inner structure of the roller member 110. A central support 128 may be disposed within the inner structure to provide a thickened wall to strengthen the roller member 110. The central support 128 may be monolithically formed or formed of two or more sections. A cap 134 may be disposed at either end of the cylindrical body 112. The bearings 120, 122 may allow the body of the roller member 110 to rotate about the rotatable shaft 130. The rotatable shaft 130 may be connected to the armature 140 and retained via a caller and pin 132. It is noted that rotatable shaft 130 may be monolithically formed or may comprise two or more sections joined together. The armature 150 may couple the roller member 110 to a bulldozer. It is noted that the armature 150 may be coupled to a front or back of the bulldozer.

In at least one embodiment, a length 140 of the rotatable shaft 130 may be about 80-100 inches, such as 89.5 inches. The distance 142 between arms 152 and 154 of the armature 150 may be about 70-90 inches, such as about 78 inches. The cylindrical body 112 may comprise a diameter 148 of about 15-25 inches, such as about 18 inches. The length 144 of the cylindrical body 112 may be about 55-75 inches, such as about 66.5 inches. The length 146 of the central support 128 may comprise about 15-35 inches, such as about 24.0 inches.

The inner bearings 122, outer bearings 120, mount plate ring 126, and cap 134 are shown in greater detail in FIGS. 6-9. It is noted that the inner bearing 122 may comprise a diameter of between 15-20 inches, such as generally 17.0 inches. The outer bearing 120 may comprise a diameter of about 14-19 inches, such as about 16.0 inches. The mount plate ring 126 may comprise a diameter of between 15-20 inches, such as generally 17.0 inches. And the cap 134 may comprise a diameter of between 15-20 inches, such as generally 17.0 inches.

Figure 10:
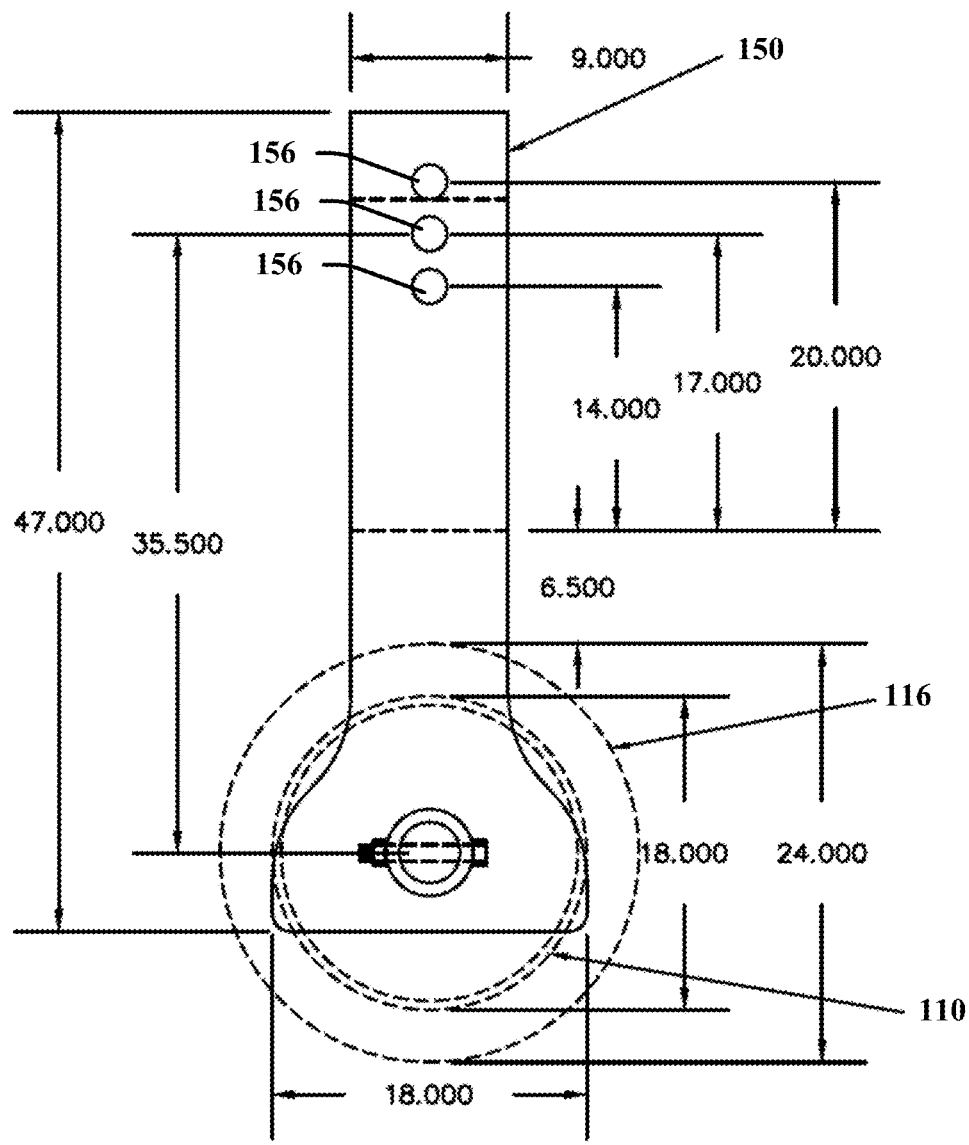
FIG. 10 is another side view of the slope roller of FIG. 1 in accordance with various disclosed aspects.

FIG. 10 provides a side view of the slope roller assembly 100 where the armature 150 comprises at least three apertures 156 disposed on either arm 152 or 154. The apertures 156 may be configured to receive a locking pin (not shown)

for attachment to a vehicle. For instance, one or more locking pins may be positioned in one or more of the apertures to couple the slope roller assembly 100 to a vehicle. In some embodiments a single aperture 156 per arm receives a locking pin. As such, a user may selectively determine the length at which an arm 152/154 is inserted within a sleeve of an attachment mechanism.

Figure 11:
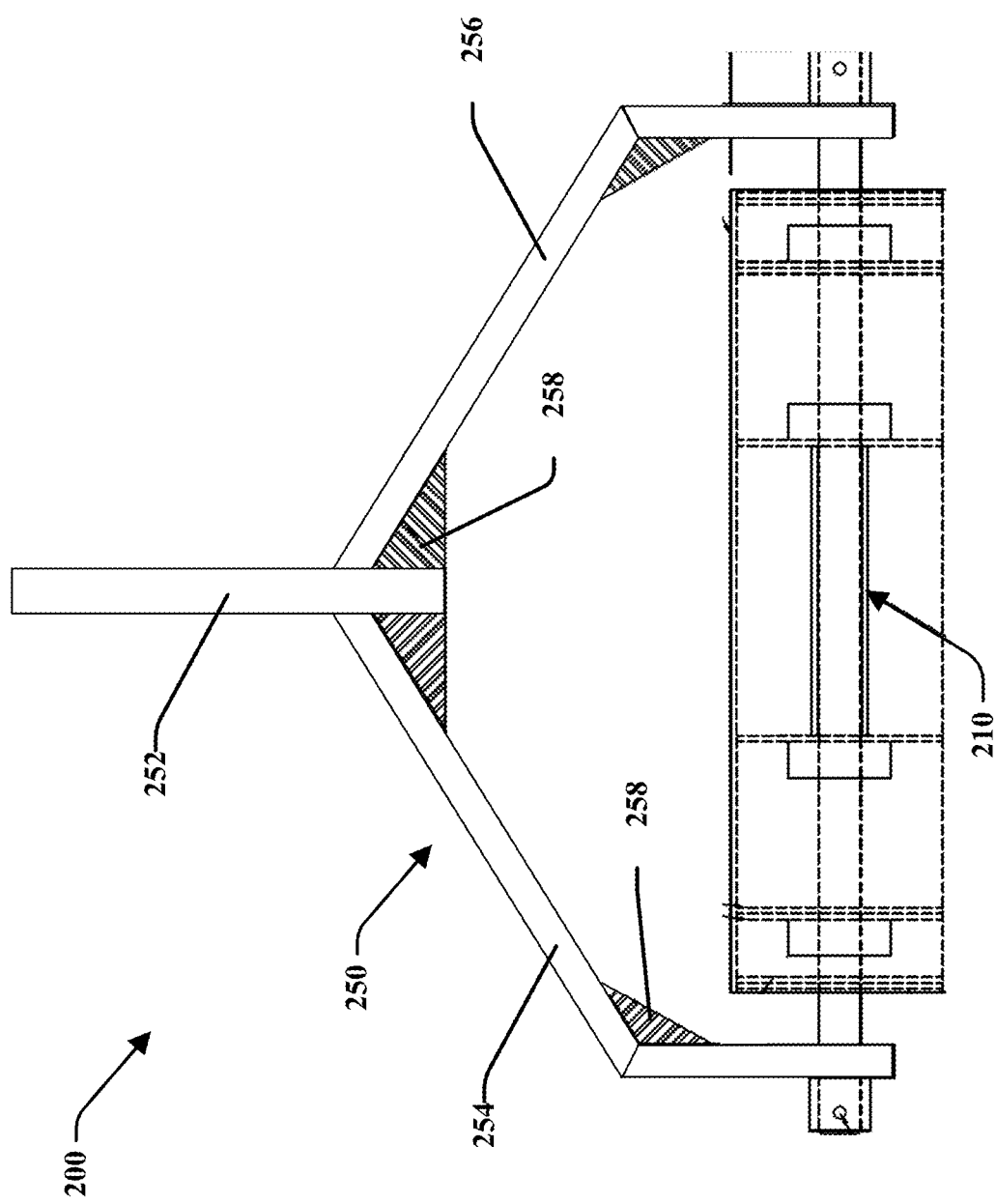
FIG. 11 is a cross-section view of a slope roller comprising a single arm armature in accordance with various disclosed aspects.

FIG. 11 discloses another embodiment of a slope roller assembly 200 primarily comprising a roller member 210 and an armature 250. The roller member 210 may contact soil to form grooves 20 and the armature 250 may allow for coupling of the roller member 210 to a vehicle. In this embodiment, the armature 250 may comprise a single attachment arm 252 with two prongs 254 and 256. This may allow for attachment to different types of vehicles, ripper assemblies, or the like. In an aspect, the armature 250 may comprise one or more gussets or brackets 258 that operatively strengthen the armature 250.

Figure 12:
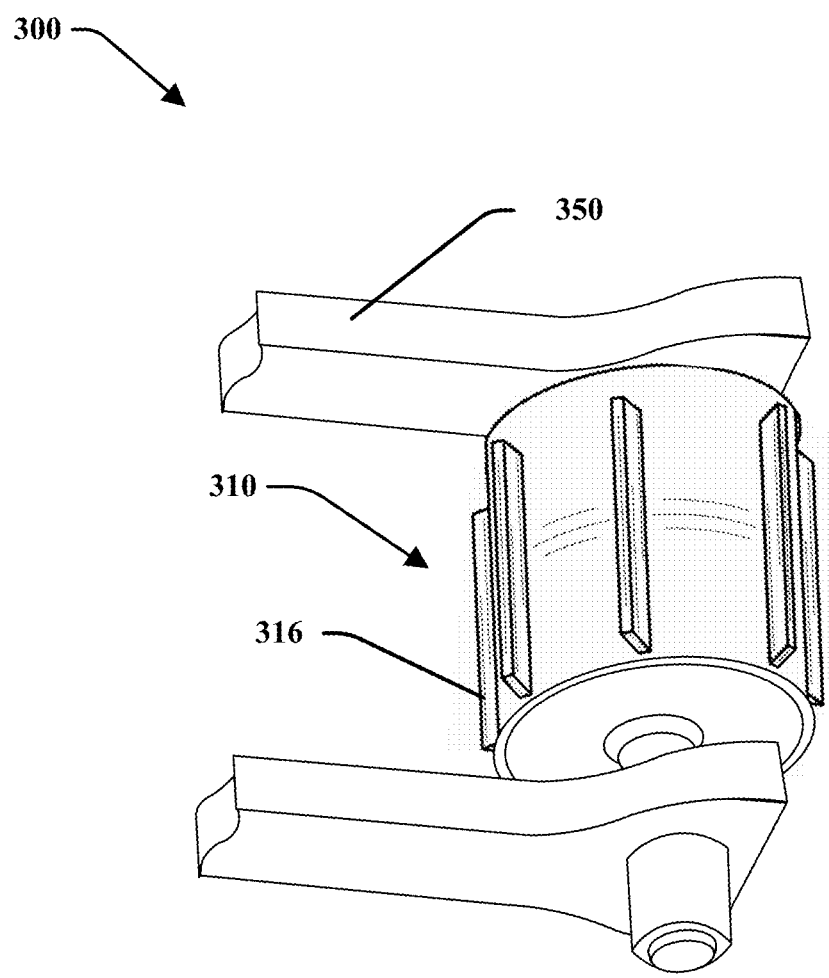
FIG. 12 is another slope roller assembly comprising one row of grouser bars in accordance with various disclosed aspects.

FIG. 12 depicts an embodiment of a slope roller assembly 300 primarily comprising a roller member 310 and an armature 350. It is noted that the roller member 310 is shown as comprising a single row of grouser bars 316. For instance, the roller assembly 300 may be sized to span a distance between two continuous tracks of a vehicle. This may allow for an increased footprint while providing a reduced weight or load for a vehicle to maneuver. It is noted that the slope roller assembly 300 may comprise different or additional grouser bars, may comprise a different size, or the like. Moreover, weights may be added to the slope roller assembly 300 to increase pressure or force on soil.

It is further noted that embodiments may use springs or other biasing members to apply pressure to soil via slope roller assemblies. Such springs may be disposed between an armature and a roller member or the like. The springs may allow for some variance or a smoother rider for an operator as they maneuver the slope roller assembly.

In an example, the slope roller apparatus may be mounted on a rear of a bulldozer. The bulldozer may pass along a track of land and the slope roller apparatus, along with the bulldozers tracks, may compress and form impressions on the land. It is noted that the land may comprise a slope, such as those typically seen on the sides of roadways.

In some traditional systems, grading or tracking slopes, particularly along a roadway, requires repetitive tracking up and down the slopes with the tracks of a bulldozer. Bulldozers typically have two sets of tracks that are approximately a foot wide. Thus, one pass on a slope only tracks about a two foot path. Described embodiments may allow for increased efficiency of tracking slopes. For instance, a slope roller apparatus may increase the amount of ground covered per pass. In at least one example, the slope roller apparatus may provide an about ten feet of additional tracking per pass. In various other examples, the slope roller apparatus may provide an additional i feet or tracking, wherein i is a number.

According to embodiments, the slope roller assembly may be attached to a rear of a bulldozer. As such, a front blade of the bulldozer may be operatively utilized when the slope roller assembly is attached to the bulldozer. In an aspect, the slope roller assembly may be attached to a hydraulic arm, such as a hydraulic ripper arm of a bulldozer. A user may, for example, selectively engage or disengage the slope roller assembly. Accordingly, the bulldozer may be operatively utilized for different functions without the need to remove and/or mount the slope roller assembly in between use.

It is noted that embodiments may include different or additional components than shown in the drawings. Moreover, aspects of this disclosure may be utilized with other apparatuses. While various components may be referred to as separate or distinct components, it is noted that such components may be monolithically formed. Likewise, components may be comprised of various subcomponents that may or may not be monolithically formed with each other.

Although the embodiments of this disclosure have been illustrated in the accompanying drawings and described in the foregoing detailed description, it is to be understood that the present disclosure is not to be limited to just the described embodiments, but that the embodiments described herein are capable of numerous rearrangements, modifications and substitutions without departing from the scope of the claims hereafter. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define a blending system. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof.

What is claimed is:

1. A slope roller assembly for roughening earth, the slope roller assembly comprising:
   a roller member comprising:
      a cylindrical body extending from a distal end to a proximal end;
      a plurality of grousers extending radially from the cylindrical body wherein the plurality of grousers comprise at least two rows of grousers comprising a first row and a second row, wherein the first row is not aligned with the second row; and
      a rotatable shaft passing through the cylindrical body,
   wherein the roller member is operatively attachable to a vehicle, and wherein the first row of grousers and the second row of grousers are constructed and arranged to produce grooves in earth that generally replicate tracks of a continuous track driven vehicle such that the tracks produced by the first row of grousers are laterally offset with tracks produced by the second row of grousers.

2. The slope roller of claim 1, further comprising an armature attached to the rotatable shaft and operatively attachable to a vehicle.

3. The slope roller of claim 2, wherein the armature comprises one or more attachment arms for attaching to the vehicle.

4. The slope roller of claim 1, wherein the at least two rows of grousers comprise a third row generally aligned with the first row.

5. The slope roller of claim 1, wherein the plurality of grousers are disposed about a surface of the cylindrical body such that a footprint of the cylindrical body is free of vertical seams.

6. The slope roller of claim 1, further comprising one or more bearings disposed within the cylindrical body, and wherein the rotatable shaft is disposed within the one or more bearings.

7. The slope roller of claim 1, further comprising an enforced central support disposed in a general center of the cylindrical body.

8. A slope roller assembly for a construction vehicle comprising:
- an armature operatively attachable to the construction vehicle; and
- a roller member selectively attached to the armature, wherein the roller member comprises a cylindrical body comprising at least two rows of grousers extending therefrom, and a rotatable shaft,
- wherein the at least two rows of grousers are constructed such that grousers in a first row of grousers are other than axially aligned with grousers of a second row of grousers, and
- wherein the roller member is operatively attached to the armature, and wherein the roller member operatively rotates about the rotatable shaft to generate horizontal impressions within a surface, and wherein a first row of grousers and a second row of grousers of the least two rows of grousers are constructed and arranged to produce grooves in earth that generally replicate tracks of a continuous track driven vehicle such that the tracks produced by the first row of grousers are laterally offset with tracks produced by the second row of grousers.

9. The slope roller assembly of claim 8, wherein the armature comprises one or more apertures that operatively receive one or more pins to secure the armature to the construction vehicle.

10. The slope roller assembly of claim 9, wherein the armature is selectively attachable to a ripper mount of the construction vehicle.

11. The slope roller assembly of claim 8, further comprising one or more springs operatively biasing the roller member away from the armature.

12. The slope roller assembly of claim 8, wherein the roller member is adjustably pressured towards the surface.

13. A slope roller system for roughening earth, comprising
- a slope roller assembly comprising an armature and a roller member, wherein the roller member is operatively secured to the armature and comprising a plurality of grouser bar protrusions extending radially therefrom such that a first row of grousers of the plurality of grousers are staggered from a second row of grousers of the plurality of grousers, and wherein the armature selectively attaches the slope roller assembly to a vehicle, wherein the first row of grousers and the second row of grousers are constructed and arranged to produce grooves in earth that generally replicate tracks of a continuous track driven vehicle such that the tracks produced by the first row of grousers are laterally offset with tracks produced by the second row of grousers;
- a camera comprising a field of view selectively comprising at least a portion of the roller member; and
- a monitor communicatively coupled to the camera and operatively displaying media associated with the roller member.

14. The slope roller of claim 13, wherein the monitor is mounted within a cab of the vehicle.

15. The slope roller of claim 13, wherein pressure exerted by the slope roller assembly is adjustable.

16. The slope roller of claim 13, wherein the plurality of grouser bars are parallel with each other.

17. The slope roller of claim 13, wherein the slope roller comprises a footprint of between generally 55 inches and 75 inches.

18. The slope roller of claim 17, wherein the footprint is free of horizontal gaps.

* * * * *